(No Model.)
W. C. CLARKE.
METHOD OF GENERATING ILLUMINATING GAS.
No. 556,737. Patented Mar. 24, 1896.
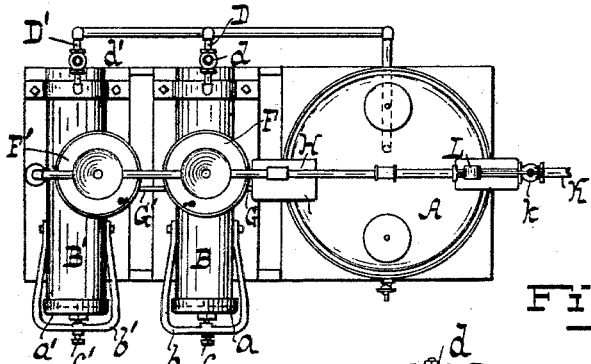
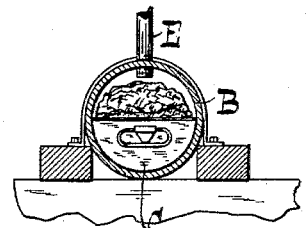
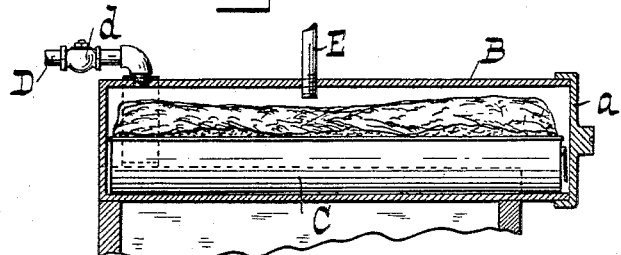
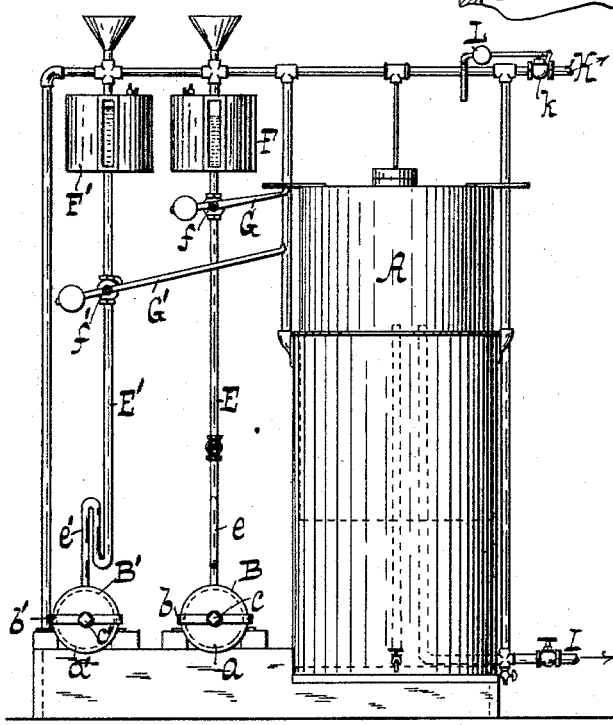
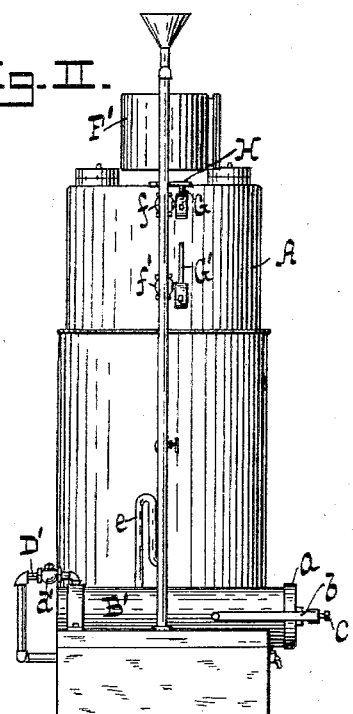
WITNESSES:
M. E. Hill
Sands F. Randall
INVENTOR
William C. Clarke
BY
Clarkson A. Collins
ATTORNEY

UNITED STATES PATENT OFFICE.

WILLIAM C. CLARKE, OF NEW YORK, N. Y.

METHOD OF GENERATING ILLUMINATING-GAS.

SPECIFICATION forming part of Letters Patent No. 556,737, dated March 24, 1896.

Application filed April 13, 1895. Serial No. 545,605. (No specimens.)

*To all whom it may concern:*

Be it known that I, WILLIAM C. CLARKE, a citizen of the United States, residing in the city of New York, in the county and State of New York, have invented a new and Improved Method of Generating and Supplying Illuminating-Gas, of which the following is a specification.

My invention applies generally to the use of acetylene gas as an illuminating-gas, and is more especially intended to be used in connection with the production of such gas by the mutual decomposition of water and an acetylide or carbide, such as the material known as "carbide of calcium." As is well known, this material, which may be taken as a type of others of kindred composition and similar nature, when brought in contact with water is decomposed, together with the water, without the application or addition of heat, giving off as the gaseous product of decomposition acetylene gas. This gas burns with a flame of great brilliance and luminosity, and hence is well adapted for use as an illuminant; and the object of my improvements is to provide a safe, simple and convenient means and method for its production and application for illuminating purposes. To this end I charge a suitable generating-chamber, which is connected by a gas-outlet with an expansible gas-holder, with a mass of carbide of calcium of any convenient size and admit limited quantities of water thereto from time to time, as required to provide or maintain a supply of gas. The gaseous product of decomposition which results upon the admission of water to the carbide passes over into the gas-holder, and the movement of the gas-holder in successive intermittent discharges as gas is drawn therefrom controls the admission of the water, so that enough gas is generated from time to time to fill the holder and keep up the supply.

A form of apparatus suitable for carrying my invention into effect is shown in the accompanying drawings.

Figure 1 of the drawings shows a side elevation of the apparatus; Fig. 2, an elevation at right angles to the view shown in Fig. 1. Fig. 3 shows a plan view of the apparatus; Fig. 4, a longitudinal section, and Fig. 5 a cross-section, of the generating-chamber.

The same letters of reference indicate corresponding parts throughout the drawings.

A indicates an expansible gas-holder, and B a cylinder or generating-chamber adapted to receive a charge of carbide, which is preferably contained in a removable cartridge or vessel C.

One end of the generating-chamber B is adapted to be opened for the insertion of the vessel C and is closed with a gas-tight cap $a$, which is firmly secured by the swinging yoke $b$ and set-screw $c$. The chamber B is connected to a pipe D, leading to the holder A. Between the holder A and the chamber B is an automatic check-valve $d$, which closes toward the chamber B.

From the chamber B a pipe E leads to a water-tank F, placed above the chamber. In the pipe E is a trap or water seal $e$, to prevent the escape of gas from the chamber through the pipe, and a valve $f$, to the stem of which is attached a weighted arm G, which is so balanced that normally the valve $f$ is kept closed.

The arm G projects toward the holder A, and is adapted to be brought in contact, by the falling movement of the holder as gas is drawn therefrom, with an arm H, which is attached to the holder. Thus when the holder A is down, or by reason of the consumption of gas descends to a point where the arm H comes in contact with the arm G, the arm G is pressed down and the valve $f$ is opened; but when the holder is lifted by the admission of gas thereto, so that the arm H is no longer in contact with the arm G, the arm G rises and the valve $f$ is closed.

From the holder A a delivery-pipe I leads to the gas-burners. In order to prevent the accidental overcharging of the holder with gas, I may connect with the holder a pipe K, which discharges into the open air and is normally closed by a valve $k$, to which is connected a weighted arm L. When the holder is forced by an excess of gas above its normal maximum elevation, it comes in contact with the arm L, lifting it and opening the valve $k$, so that the excess of gas is discharged until the holder settles and falls away from the arm L, when the valve $k$ is again closed.

The method of operation is as follows: Beginning where there is no gas in the holder A, the generating-chamber is charged with such a quantity of carbide of calcium, preferably contained in a perforated cartridge or an open vessel, such as C, as can be conveniently manipulated or as the generating-chamber will contain. Preferably the size of the charge in relation to the size of the generating-chamber is such that when it is fully decomposed the solid products of decomposition will substantially fill the generating-chamber, so that all the gas produced will be forced out and into the holder. A small quantity of water is then poured into the tank F and passes down into the generating-chamber, causing the decomposition of a corresponding amount of the carbide, and the resulting discharge of gas passes through the pipe D into the holder, filling and lifting it. The arm G is set free and the end of it nearest to the holder rises, closing the valve $f$. The tank F is then filled with a quantity of water sufficient to effect the decomposition of the entire charge of carbide in the generating-chamber. As gas is drawn from the holder A it settles until the arm H comes in contact with the arm G, which is pressed down, slightly opening the valve $f$, and a small quantity of water trickles down the pipe E into the generating-chamber, causing the generation of a fresh quantity of gas by which the holder is again lifted, the valve $f$ being again closed, and this operation is automatically repeated until all of the carbide in the generating-chamber has been decomposed.

The valve $f$ is opened gradually as the holder A settles, so that the water enters the pipe below it gradually; but the contact of the water with the carbide is quickly followed by the discharge of gas, which immediately raises the holder A and closes the valve $f$. The discharge of water is thus limited by the movement of the holder and the successive discharges of gas, the quantity of each of which, being determined by the quantity of water admitted to the generator, is practically uniform, and under the normal conditions of ordinary operation will never exceed the capacity of the holder. The range of movement of the holder, and consequently the amount of water admitted to the generator at each movement of the holder, is practically uniform, although, as the operation proceeds, such movement, and consequently the amount of water added, is somewhat increased, because a certain amount of time is necessary for the water to penetrate the lime which has been formed on the surface of the mass of carbide by the earlier discharge of water. This, however, will not increase the upward movement of the holder by reason of the production of an additional quantity of gas, because as soon as the water comes in contact with the undecomposed carbide sufficient gas is instantly generated to force the holder up and close the valve. Any additional amount of gas which might be generated by the presence of the body of wet lime in the generator would come off slowly and would merely have the effect of retarding the descent of the holder and thereby prolonging the period during which the valve remains closed.

In order to provide for the longer operation of the apparatus without recharging, and also to enable the supply of gas to be kept up without interruption while the chamber B is being recharged with carbide, I provide an additional generating-chamber B', which is also connected to the pipe D, leading to the gas-holder, and is provided with a water-supplying arrangement similar to that described in connection with the chamber B. In this case the arm G', which is attached to the stem of the valve $f'$ in the pipe E', leading from the water-tank F' to the chamber B', is set at such a level that the arm H will not come in contact therewith until, by reason of the decomposition of all the carbide in the chamber B, or the exhaustion of the water in the tank F, gas is no longer delivered from the chamber B to the holder, and the holder consequently sinks to a lower level than that at which it is when the arm H comes in contact with the arm G. The arm H then comes in contact with the arm G', the valve $f'$ is opened, and gas begins to be discharged from the chamber B' into the holder. When it appears on inspection that the generator B' is in operation, the chamber B can be opened, the products of decomposition removed, and a fresh charge inserted without interfering with the supply of gas to the holder. The escape of gas when the chamber B is opened is prevented by the check-valve $d$, which is closed by the gas-pressure from within the holder. It will thus be evident that the chamber B' acts as a supplementary generator, coming into use only when the chamber B is empty or when the charge in it is so exhausted as to no longer give a supply of gas. On recharging the chamber B and filling the tank F gas will be again delivered from it to the holder, to the exclusion of the chamber B'.

The water-tank F may be arranged so as to be supplied with water directly from the water system of the house, or if preferred the pipe E may be connected directly with a water-pipe, omitting the tank F. I prefer, however, to use the tank, since in this way a measured quantity of water only sufficient for the decomposition of the contents of the generating-chamber can be supplied and the solid products of decomposition can be removed from the chamber in a relatively dry state, without the disagreeable slop that would result if a surplus of water should be allowed to enter the chamber. Moreover, since a known quantity of carbide is used in the generating-chamber, the use of a known quantity of water sufficient for the entire ultimate decomposition of the mass of carbide enables the aggregate amount of gas that will be generated and consequently the length of time that the apparatus will run with a given consumption of gas without recharging to be easily ascertained, and a convenient means of ascertaining and checking the consumption of gas is afforded.

Since the gas is generated only as required and in small quantities, the gas-holder need not be of large size, its function being rather to regulate the admission of water to the generator than to act as a storage-reservoir for the gas.

The charge of carbide is limited in amount only by the question of convenience in handling and the size of the generating-chamber, upon the size of which depends the effective capacity of the apparatus, the other parts not requiring to be varied in size to increase such capacity, and hence it will be evident that by means of my invention I am enabled with a small apparatus, the first cost of which is not excessive and which can easily be set in a house, cellar or an underground vault, to provide a continuous supply of gas for a very considerable period without any manipulation or recharging.

I do not claim broadly herein the bringing together of measured quantities of carbide of calcium and water so proportioned as to effect the practically entire decomposition of both, as I have made the same the subject of a separate application for Letters Patent, Serial No. 576,284, filed January 21, 1896.

What I claim as new, and desire to secure by Letters Patent, is—

1. The process of producing illuminating-gas without the addition of heat, which consists in bringing in contact with each other a liquid and a solid which by their union produce a fixed gas, in determined quantities so proportioned as to effect the decomposition of both, said contact being produced by a series of intermittent discharges of the liquid upon the solid, substantially as described.

2. The process of producing illuminating-gas without the addition of heat, which consists in bringing a determined quantity of water into contact with a mass of solid material, which by its union therewith produces a fixed gas (the quantity of water being limited to that required to effect the decomposition of the solid) by intermittently discharging the water upon the solid material, producing thereby intermittent discharges of gas, and determining the frequency of said discharges by the consumption of the gas itself, substantially as described.

3. The process of producing illuminating-gas without the addition of heat, which consists in bringing in contact with a mass of solid material, which by its union with water produces a fixed gas, such a quantity of water as is practically only sufficient for the decomposition of said mass, by intermittently discharging the water upon the same, thereby producing intermittent discharges of gas, and determining the frequency of said discharges by the consumption of the gas itself, substantially as described.

4. The process of producing illuminating-gas without the application of heat, which consists in discharging upon a mass of solid material which, upon decomposition by water, produces a fixed gas, a quantity of water so proportioned to the mass of solid material as to effect the practically entire decomposition of both, and determining and regulating such discharge by the consumption of the gas produced.

5. The process of producing illuminating-gas without the application of heat, which consists in intermittently adding water to a mass of metallic carbide which, by union therewith, produces a fixed gas, thereby producing intermittent discharges of gas, and receiving such discharges in an expansible gas-holder, each of such intermittent additions being retained in the presence of the carbide until its decomposition is effected and being of such limited quantity that the quantity of gas produced thereby will not be sufficient to carry the gas-holder to the upward limit of its throw.

6. The process of producing illuminating-gas without the application of heat which consists in intermittently adding water to a mass of metallic carbide which by union therewith produces a fixed gas, thereby producing intermittent discharges of gas and receiving such discharges in an expansible gas-holder, each of such intermittent additions being retained in the presence of the carbide until the decomposition is effected and being of such limited quantity that the gas produced thereby will not be sufficient to fill the gas-holder, and determining the frequency of such intermittent additions by the consumption of the gas itself, substantially as described.

In testimony whereof I have hereunto subscribed my name this 9th day of April, A. D. 1895.

WM. C. CLARKE

Witnesses:
WM. H. ERWIN,
CLARKSON A. COLLINS.